3,060,179
POLYMERIZATION OF AROMATIC NITRILES
William G. Toland, San Rafael, Calif., assignor to California Research Corporation, San Francisco, Calif., a corporation of Delaware
No Drawing. Filed Jan. 4, 1960, Ser. No. 44
5 Claims. (Cl. 260—248)

The present invention relates to the polymerization of aromatic nitriles employing a unique catalyst system. More particularly, the invention has to do with the trimerization of benzonitrile and aromatic dinitriles to form aromatic substituted triazines, such as 2,4,6-tris(cyanophenyl)-1,3,5-triazines from the phthalonitriles, employing certain metal salts as catalysts.

The preparation of 1,3,5-triazines from aromatic mononitriles, such as benzonitrile to produce cyaphenine, is known. The polymerization may be catalytic or conducted in the absence of catalyst employing heat or heat and pressure. Various catalyst systems have also been described. These include the amides and hydrides of alkali metals and alkaline earth metals, sulfuric acid, zinc diethyl, bromine, metallic sodium, and aluminum chloride. It has also been proposed to employ starting materials other than nitriles, such as thioamides and imido esters, but these give rise to more complex reaction systems than is the case with the nitriles.

I have now discovered that the trimerization of aromatic nitriles, such as ortho-, meta-, and para-phthalonitriles can be readily and smoothly effected with a catalyst material, which, although inoperable with certain mononitriles, are exceedingly effective with the aromatic dinitriles. These compounds, taking that derived from isophthalonitrile as typical, may be represented by the following formula:

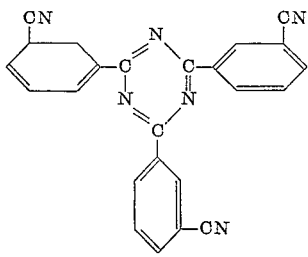

I have discovered that tricyanogen compounds can readily be prepared by heating the appropriate aromatic nitrile, e.g., isophthalonitrile, to an elevated temperature, i.e., 200° C. to 400° C., preferably 300° to 350° C., in the presence of a metal salt present in a catalytic amount, e.g., 0.01 to 5%, preferably 1 to 2%, by weight, based on the aromatic nitrile, the salt moreover being a soluble salt of the transitional metals of atomic number 22 to 30, inclusive. By soluble salt is meant one that is soluble in the nitrile at least to the extent of 0.01%, by weight, at the specified reaction temperatures. Specific examples of suitable salts are manganous bromide acetate monohydrate, cobalt bromide hexahydrate, zinc chloride, titanium chloride, vanadyl chloride, ferric chloride, chromic chloride hexahydrate, cupric acetate monohydrate, cuprous cyanide, cupric cyanide, cupric sulfate pentahydrate, cobalt bromide dihydrate, and cobalt bromide. Preferred are the soluble salts of cobalt, manganese, and copper. It is to be noted that while the hydrates of certain of the above salts decompose at the elevated temperatures of reaction, no adverse effect is observable due to the loss of water, the resulting anhydrous salt being yet effective. Also, at the elevated temperatures of reaction, some of the salts may vaporize. Their loss from the system may be avoided and their effectiveness preserved by conducting the reaction under superatmospheric pressures, as known to those skilled in the art. In other words, such pressures are employed so as to maintain a liquid phase reaction under the specified reaction temperatures.

As will readily occur to those skilled in the art, variations in the time of polymerization will depend on catalyst, catalyst concentrations, temperature, and nitrile employed. Generally, reaction time can vary from ½ hour to 20 hours, i.e., until conversion of the nitrile into the triazine has occurred to the desired degree. Following polymerization, the trimer can be isolated and purified by known principles, including sublimation and extraction with organic solvents, e.g., acetone, benzene, pyridine and xylene.

The following examples are illustrative of the practice of the invention.

*Example 1*

300 g. of isophthalonitrile was heated with 2.0 g. of cobaltous bromide hexahydrate ($CoBr_2 \cdot 6H_2O$) to 315° C. for 4 hours in a glass-lined rocking autoclave. Pressure was too low to measure (below 50 p.s.i.g.). The reaction products were partially cooled and then filtered, the filter cake, comprising crude trimer, being then washed with hot xylene. 194.1 g. of crude trimer, i.e., 2,4,6-tris(metacyanophenyl)-1,3,5-triazine was obtained. Evaporation of the filtrate left 93.2 g. of unreacted isophthalonitrile, representing a conversion of 69% and a yield of 94% of theory.

Pure trimer was obtained by sublimation in a stream of nitrogen at 400–500° C. followed by hot extraction with boiling acetone to remove impurities. Melting point of the trimer was 382–385° C., and analyzed as follows:

Percent C found, 74.79; 74.85 (theory, 75%)
Percent H found, 3.00; 3.10 (theory, 3.12%)
Percent N found, 22.08; 22.24 (theory, 21.88%)

The above product was further identified by its infrared spectrum which showed adsorption typical of the triazine ring, of cyano groups, and of meta substitution.

*Example 2*

24.6 grams of terephthalonitrile and 0.2 gram of cobaltous bromide were placed in a Carius tube and heated at a temperature of 290° C. for 4 hours. Following reaction, the reaction products were cooled, diluted with benzonitrile, and filtered hot. The filter cake of crude trimer was washed with hot xylene to remove unreacted terephthalonitrile. 16.7 grams of trimer, representing a conversion of 67.8%, was obtained.

The crude trimer was then purified by sublimation in a stream of nitrogen at 480° C. followed by hot extraction with hot benzonitrile and then xylene to remove additional impurities. The pure 2,4,6-tris(paracyanophenyl)-1,3,5-triazine had a melting point of about 504° C. It analyzed as follows:

|        | Percent C    | Percent H  |
|--------|--------------|------------|
| Theory | 75           | 3.12       |
| Found  | 74.73, 74.61 | 3.14, 3.24 |

Its infrared spectrum showed the presence of the triazine ring, nitrile groups, and parasubstitution.

*Example 3*

300 g. of isophthalonitrile and 3 g. zinc chloride in a glass-lined rocking autoclave were heated to a temperature of 290° C. for 6 hours. The product was worked up as in Example 1, i.e., reaction product mixture was cooled, extracted with hot xylene and filtered. There was recovered 138.6 g. of solid trimer. Upon evaporation of the filtrate, unconverted dinitrile was determined to be 140 g., representing a conversion of 46.2% and a yield of 86.6%.

Example 4

200 g. of isophthalonitrile were heated with 1 g. of cobaltous bromide dihydrate at a temperature of from 230°–275° C. for 6 hours in a glass-lined rocking autoclave. Following reaction, the product was worked up as before, namely by filtration and washing with xylene. Conversion of the isophthalonitrile to trimer was 17.5%.

Example 5

300 g. of isophthalonitrile were heated with 2 g. of cobaltous bromide dihydrate at 275°–279° C. for a period of 14 hours. The reaction products were cooled, extracted with hot xylene, and filtered, whereupon 66.4 g. of trimer were obtained, representing a conversion to trimer of 22.1%. From the filtrate there was distilled 238.3 g. of unreacted isophthalonitrile, which was heated in the presence of 2 g. of fresh cobaltous bromide dihydrate at a temperature of 277°–281° C. for 19 hours. After reaction, the products were cooled and diluted with xylene, whereupon the trimer separated. The products were then filtered and the filter cake washed with xylene to remove unreacted isophthalonitrile. The filter cake weighed 73.3 g. and evaporation of the filtrate yielded 142.7 g. of unreacted isophthalonitrile, representing a conversion to trimer of 30.7% and a yield of 88.8%.

Example 6

In an open glass vessel provided with means for refluxing and for stirring, there were placed 16 g. of isophthalonitrile and 0.5 g. of cobaltous bromide dihydrate. The vessel was heated to a temperature of 235°–240° C. for a period of 2.75 hours. Conversion of isophthalonitrile to trimer was obtained in an amount of 51.3%.

Example 7

In an open vessel provided with means for stirring and refluxing, 16 g. of isophthalonitrile and 0.5 g. of zinc chloride were heated to 230°–245° C. for 4.25 hours. Conversion to trimer was obtained in an amount of 31.6%.

Example 8

In an open vessel, as in Examples 6 and 7, there were placed 32 g. of isophthalonitrile and 1 g. of cupric acetate monohydrate. The mixture was heated to a temperature of 315° C. for two hours. The product was worked up as in the previous examples and a conversion to trimer of 45.3% was obtained. Yield of trimer was 92.4%.

Example 9

In an open vessel provided with means for stirring and refluxing, 5 g. of orthophthalonitrile were heated in the presence of 0.05 g. of zinc chloride for 5 hours at a temperature of 272°–280° C. Following reaction, conversion of orthophthalonitrile to trimer was determined to be 48.3%. Its identity was established by comparison with the known infrared spectrum and X-ray pattern of this compound.

Example 10

515 g. of benzonitrile were heated in the presence of 18 g. of cuprous cyanide at a temperature of 340° C. for a period of 2 hours. 2,4,6-tris(phenyl)-1,3,5-triazine was obtained in substantial yields.

Example 11

0.2 g. of manganese bromide acetate monohydrate (MnBrAc·H$_2$O) was added to 5.0 g. of isophthalonitrile in a test tube and the mixture heated in a silicone bath with occasional stirring. After 45 minutes at 280° C., most of the mixture had solidified. Heating was continued for a total of 1½ hours. The products were washed with hot xylene and extracted with boiling acetone to leave 3.2 g. of a light cream-colored solid of trimer nitrile.

Example 12

To a test tube was added 16 g. of isophthalonitrile and 0.5 g. of titanium tetrachloride (TiCl$_4$). After heating to 215° C., the liquid had become black and no solids were present. Heating was continued at 190°–240° C. for a total of 4 hours. The product was then diluted with benzonitrile and filtered hot. After further washing with additional benzonitrile and drying, there remained 4.38 g. of brown, crude isophthalonitrile trimer.

Example 13

An 8-inch test tube was charged with 16 g. of isophthalonitrile and 0.5 g. of vanadyl chloride (V$_2$O$_2$Cl) (technical). The mixture was heated to 190°–245° C. for 5 hours. White solids began appearing after about 2½ hours. Reaction products were diluted with benzonitrile and filtered hot. The cake was washed with additional benzonitrile and finally with ether leaving 4.27 g. of gray, crude isophthalonitrile trimer.

Example 14

A test tube was charged with 16 g. of isophthalonitrile and 0.5 g. of anhydrous ferric chloride (FeCl$_3$). The catalyst was all in solution at 183° C. After 4½ hours of heating at 190°–245° C., most of the product appeared to be solid. After dilution with benzonitrile, the mixture was filtered hot and the cake washed with additional cold benzonitrile and finally with ether. There remained 9.65 g. of crude, dry isophthalonitrile trimer.

Example 15

A test tube was charged with 16 g. of isophthalonitrile and 0.5 g. of chromic chloride hexahydrate (CrCl$_3$·6H$_2$O)

The mixture was heated at 190°–240° C. for 4½ hours. Products were diluted with benzonitrile and filtered hot. The cake was washed with additional cold benzonitrile and finally with air to give 2.56 g. of greenish-white solid, crude isophthalonitrile trimer.

Example 16

A glass-lined autoclave was heated to 315° C. with 515 g. benzonitrile and 1 g. cobalt bromide dihydrate (CoBr$_2$·2H$_2$O), for 2 hours. The products were distilled to recover benzonitrile. Crude cyanphenine was recovered from the bottoms and was purified by recrystallization from benzene.

While the foregoing examples illustrate the use of phthalonitriles and benzonitrile, other substituted aromatic nitriles can be used, for example, those also containing a carboxyl group, carboxyl salts, amides and esters thereof, nitro, sulfonic acid and sulfone groups, substituted benzonitriles and phthalonitriles, and polycyanobenzonitriles. Alkyl and halo substituents make trimerization less rapid, but, when present with at least two of the above substituents, they can be used satisfactorily.

I claim:

1. Process for preparing a 1,3,5-triazine from an aromatic nitrile selected from the group consisting of benzonitrile, orthophthalonitrile, isophthalonitrile and terephthalonitrile, which comprises heating the aromatic nitrile to a temperature in the range 200°–400° C. in the presence of a metal salt catalyst soluble in the nitrile in an amount of at least 0.01%, by weight, at the specified temperature range, the catalyst consisting of a salt selected from the group consisting of the chloride, bromide and acetate of a metal selected from the group consisting of copper, manganese and cobalt.

2. Process according to claim 1 wherein the temperature is in the range of 300°–350° C.

3. Process according to claim 1 wherein the nitrile is isophthalonitrile.

4. Process according to claim 1 wherein the nitrile is terephthalonitrile.

5. Process according to claim 1 wherein the catalyst salt is present in an amount of 1 to 2%.

References Cited in the file of this patent

UNITED STATES PATENTS

| | | |
|---|---|---|
| 1,989,042 | Kunz et al. | Jan. 22, 1935 |
| 2,598,811 | Mahan et al. | June 3, 1952 |

FOREIGN PATENTS

| | | |
|---|---|---|
| 1,098,518 | Germany | Feb. 2, 1961 |

OTHER REFERENCES

Dent et al.: Journ. of the Chem. Soc., 1934, part II, pages 1027–30; 1033 and 1039.

Linstead et al.: Journ. of the Chem. Soc., 1934 (part II), pages 1022 to 1027.

Dent et al.: Journ. of the Chem. Soc., 1938, pages 715–7.

Chemical Abstracts, vol. 43, col. 1996 (1949).

Ross et al.: Journ. of the Am Chem. Soc., vol. 72, pages 3302 to 3304 (1950).

Swamer et al.: J. Org. Chem., vol. 16, pages 43 to 46 (1951).

Smolin et al.: "S-Triazines and Derivatives," pages 149–53; 172 and 176, Interscience Publishers Inc., February 1959.